United States Patent [19]

McCoy

[11] 3,881,951
[45] May 6, 1975

[54] LITHIUM ELECTRODE AND METHOD OF PRODUCING THE SAME

[75] Inventor: Lowell R. McCoy, Woodland Hills, Calif.

[73] Assignee: Rockwell International Corporation, El Segundo, Calif.

[22] Filed: July 5, 1974

[21] Appl. No.: 485,852

[52] U.S. Cl. ............................. 136/20; 136/120 R
[51] Int. Cl. ......................................... H01m 35/02
[58] Field of Search ............... 136/20, 120, 6 L, 83; 75/66, 135; 117/230, 130, 131

[56] References Cited
UNITED STATES PATENTS

| | | | |
|---|---|---|---|
| 3,484,296 | 12/1969 | Buzzelli | 136/120 R |
| 3,508,967 | 4/1970 | Lyall et al. | 136/20 |
| 3,639,174 | 2/1972 | Kegelman | 136/20 |

*Primary Examiner*—John H. Mack
*Assistant Examiner*—C. F. Lefevour
*Attorney, Agent, or Firm*—L. Lee Humphries; Henry Kolin; Clark E. DeLarvin

[57] ABSTRACT

A lithium electrode providing improved cycle life comprising a foraminous metal substrate filled with liquid lithium and a selected amount of a metal additive that is either copper, zinc, or mixtures thereof. The electrode is produced by either first coating the substrate with the metal additive and then electrochemically charging liquid lithium into the substrate; alternatively, the substrate is immersed in a molten bath containing the liquid lithium and the metal additive.

15 Claims, 1 Drawing Figure

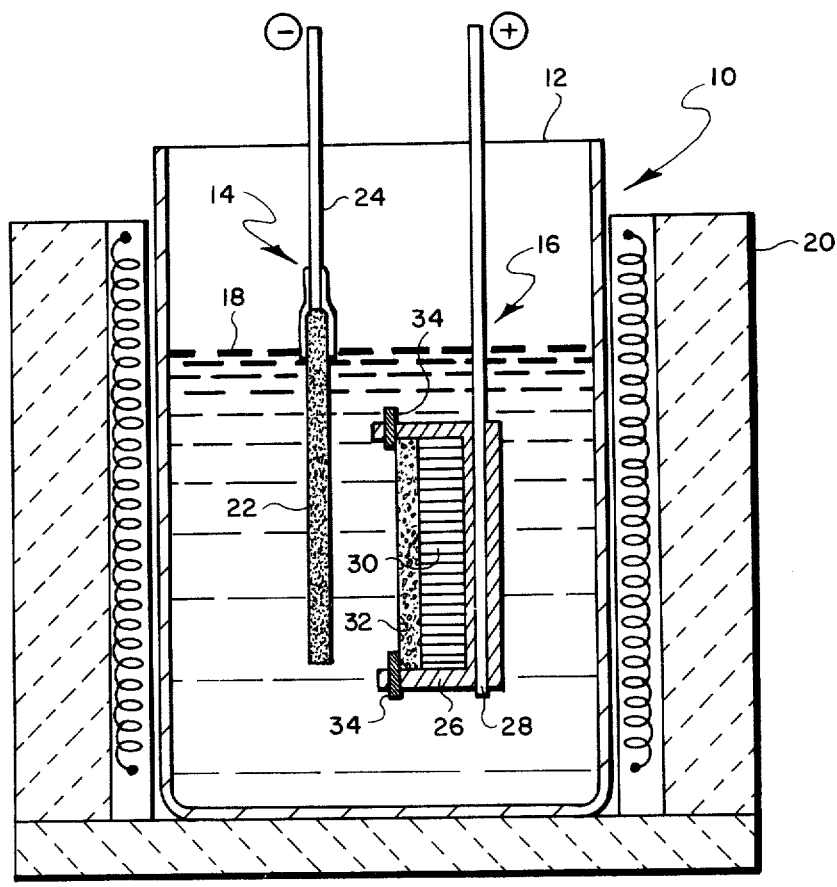

3,881,951

LITHIUM ELECTRODE AND METHOD OF PRODUCING THE SAME

BACKGROUND OF THE INVENTION

1. Field of the Invention

This invention relates to a lithium electrode and a method of producing the same. The electrode comprises a foraminous metal substrate filled with a mixture of liquid lithium and another selected metal. The filled foraminous metal substrate is particularly suitable for use as the negative electrode in a molten salt electrolyte containing battery.

2. Prior Art

Heretofore two approaches have been followed in the construction of lithium anodes for use in lithium-sulfur rechargeable batteries. In one approach the lithium is alloyed with another metal such as, for example, aluminum to form a solid at the operating temperature. In the other approach, liquid lithium is retained in a foraminous metal substrate by capillary action. The latter approach is preferred because it offers higher cell voltages and therefore potentially higher battery energy densities. Certain problems are encountered, however, when it is attempted to retain molten lithium in a foraminous metal substrate. More particularly, most metals which are readily wettable by lithium are too soluble in the lithium to permit their use as the metal substrate, whereas most metals structurally resistant to attack by molten lithium are poorly wetted by the lithium when placed in a molten salt electrolyte.

It has been suggested that the metals structurally resistant to attack by molten lithium may be wetted by immersion in molten lithium maintained at a high temperature (650°–700°C). However, the structures so wetted by lithium usually undergo progressive dewetting when used as the anode in a secondary battery containing a molten salt electrolyte maintained at the substantially lower temperature at which such batteries operate (approximately 400°C). When a battery containing such a wetted substrate undergoes a number of cycles, it has been found that lithium no longer preferentially wets the substrate and the electrode progressively loses capacity. Various methods have been proposed in an attempt to overcome this problem.

U.S. Pat. No. 3,409,465 describes a process for wetting a perforated metal body with a molten alkali metal. The perforated metal body first is plated with cadmium or gold and then wetted with the molten alkali metal.

More recently, in U.S. Pat. No. 3,634,144 there is suggested another method for preparing a lithium-filled foraminous metal substrate. The method comprises oxidizing the foraminous metal substrate to form a surface film of metal oxides substantially throughout the open internal and external surface areas of the foraminous substrate. The substrate then is immersed in a molten lithium bath to fill the foraminous substrate with lithium.

None of the methods suggested heretofore have proven entirely satisfactory. There still is need, therefore, for a method of wetting the foraminous substrate with lithium whereby it will not lose its wettability when used as a negative electrode in a molten salt electrolyte secondary battery.

Other patents considered in the preparation of this application are U.S. Pat. Nos. 3,226,261; 3,226,264; and 3,226,341; and French Pat. No. 1,403,195 which relate to fuel cell electrodes. Patents considered which relate to organic electrolyte batteries are U.S. Pat. Nos. 3,413,154; 3,484,296; 3,493,433; and 3,508,967. Patents relating to molten salt batteries which were considered are U.S. Pat. Nos. 3,506,490; 3,506,491; 3,506,492; and 3,666,560.

SUMMARY OF THE INVENTION

In accordance with the present invention there is provided a lithium electrode which comprises a foraminous metal substrate having an apparent density of from about 5 to 80 percent and a median pore size of from about 5 to 500 microns, this substrate being filled with liquid lithium and a metal additive selected from the group consisting of copper, zinc and mixtures thereof. This mixture is present in an amount sufficient to fill at least 20 percent of the volumetric capacity of the metal substrate. It is an essential feature of the present invention that the selected metal be present in an amount of at least 10 wt. percent of the total lithium-additive mixture contained in the foraminous substrate.

The method of producing the lithium electrode comprises contacting the foraminous substrate with liquid lithium in the presence of the metal additive selected from the group consisting of copper, zinc and mixtures thereof. In accordance with one embodiment of the method, the foraminous substrate is immersed in a molten bath comprising lithium and the selected metal. In accordance with another embodiment of the method, the selected metal is deposited upon the foraminous substrate in the required amount. The substrate then is placed in a molten salt electrolyte containing lithium ions and the lithium is electrodeposited on the substrate.

BRIEF DESCRIPTION OF THE DRAWING

The sole FIGURE of the drawing is a cross-sectional elevational view of a secondary lithium-molten salt battery utilizing a lithium negative electrode in accordance with the present invention.

DETAILED DESCRIPTION OF THE INVENTION

The metal substrates contemplated herein are substrates formed from metals having a melting point above the melting point of lithium (about 179°C) and, further, substantially above the operating temperature of the battery (which temperature generally is in the range of from about 250° to about 650°C) in which the metal substrate is to be used as an electrode. The metal also should have a low resistivity and be substantially insoluble in lithium. Therefore, the metal selected for use as the substrate should have a melting point of at least 1000°C, a resistivity of less than $150 \times 10^{-6}$ ohm-cm at 20°C, and a solubility in lithium of less than about 1000 ppm at 500°C. Examples of suitable metals include titanium, zirconium, iron, nickel, cobalt, tungsten, molybdenum, manganese, chromium and combinations thereof such as the stainless steels. The metal also may be an alloy of one or more of the foregoing metals and another material such as, for example, a low carbon steel (iron containing from about 0.10 to about 0.20 percent carbon) provided such alloy meets the specified melting point, resistivity and solubility requirements. The resistivity and melting points of metals and alloys are found in numerous engineering texts; for information regarding the solubility of metals in lithium, see *Constitution of Binary Alloys*, Second Supplement, F. A. Shunk McGraw-Hill (1969).

The term "foraminous metal substrate" as used herein refers to a porous metal body having an apparent density of from about 5 to 80 percent of the density of the base metal. Preferred foraminous metal substrates have an apparent density of from about 5 to 60 percent of that of the base metal, and particularly good results have been obtained using foraminous substrates having an apparent density of from about 10 to 20 percent of that of the base metal. The median pore size of the foraminous substrate also is important and must be within the range of from about 5 microns up to about 500 microns. Generally, the foraminous substrate will be selected to have a median pore size within the range of from about 20 to about 200 microns, and particularly good results have been obtained with foraminous substrates having a median pore size of about 50 microns ($\mu$).

It is apparent that capillary retention will be more effective as the pore size is decreased. Where the median pore size greatly exceeds 500 $\mu$, only limited quantities of liquid lithium will be reliably retained within the porous structure and the coulombic capacity of a given unit weight or volume of the foraminous structure will be low. To maximize the ratio of the weight of lithium to that of the structure, it is desirable that the apparent density of the structure be equal to or less than 20 percent. As the apparent density is further decreased, it becomes more difficult to fabricate foraminous structures with pore sizes approaching 50 $\mu$ or less and yet retain good physical strength. Where the median pore size is much less than 5 $\mu$, it will be difficult to assure rapid enough transport of lithium through a foraminous support of substantial thickness to permit discharge or charge at useful current densities.

In a preferred form, the foraminous substrate comprises a plurality of non-woven metal fibers compacted to a desired apparent density and then sintered to provide a structurally sound body. Acceptable substrates can be obtained by sintering metal powders to form porous plaques using known techniques. Foamed metal structures can also be used, provided that they have open cells and otherwise satisfy the pore size and density ranges given above.

The shape or form of the foraminous metal substrate is not critical. The selection of a particular form will be a design choice based upon the size and configuration of the battery in which the substrate will be used as an electrode.

The foraminous metal substrate is filled with a mixture of lithium and metal additive by contacting it with a major amount of a molten lithium in the presence of a minor amount of a metal additive selected from the group consisting of copper, zinc and mixtures thereof in any proportions.

It is an essential feature of the present invention that the selected metal constitute at least 10 wt. percent of the total quantity of lithium-metal additive mixture held within the foraminous substrate. Generally, it is preferred that the selected metal be present in an amount of at least 20 percent; for example, from about 20 up to about 45 wt. percent of the total weight of lithium-additive metal mixture in the foraminous substrate. Particularly good results are obtained when the selected metal is present in an amount of about 30 wt. percent of the total weight of lithium-metal additive mixture in the foraminous substrate.

To be an effective electrode the lithium and selected metal should occupy at least 20 percent of the total volumetric capacity of the foraminous substrate. Generally, the lithium and selected metal will be provided in an amount sufficient to occupy from 50 to 100 percent of the total volumetric capacity of the foraminous metal substrate.

The volumetric capacity of a particular substrate will depend on the capillary properties of the substrate and is determined largely by the pore size range of the substrate. The capacity of a specific substrate can be determined by weighing the substrate before and after permeation with a mixture of lithium and the selected metal or metals where these have known weight ratios. When the substrate has a large pore size, however, some lithium may escape initially from the electrode on its immersion in the molten salt electrolyte. It is preferable, therefore, to determine the capacity by electrically discharging the electrode and determining its capacity coulometrically in the molten salt after any initial escape has occurred.

In accordance with one embodiment of the method, the foraminous metal substrate first is provided with a coating of the selected metal. The selected metal coating may be either an electrolytic or an electroless coating obtained using known techniques. The coating may be applied to the individual particles or fibers from which the foraminous substrate is formed or applied to the foraminous substrate after it is formed. The desired amount of lithium is then electrodeposited into the coated foraminous metal substrate from a suitable lithium-containing molten salt bath.

Foraminous metal substrates filled with lithium in accordance with the present invention are particularly useful as the negative electrode (anode) in a secondary (rechargeable) electrochemical cell (or battery) of the type which utilizes a molten salt electrolyte and a metal sulfide cathode.

The term "molten salt electrolyte" as used herein refers to a lithium halide containing salt which is maintained at a temperature above its melting point. The molten salt may be either a single lithium halide, a mixture of lithium halides or a eutectic mixture of one or more lithium halides, and other alkali metal or alkaline earth metal halides.

The suitable alkali or alkaline earth metal ion should have a deposition potential very close to or preferably exceeding the deposition potential of lithium ion in the electrolyte. Thus lithium halide salts can be readily combined with halides of potassium, barium and strontium. Halides of metals such as cesium, rubidium, calcium or sodium may be used but a substantial proportion of these metals may be co-deposited with the lithium when the electrode is charged with a resulting small loss in potential. Typical binary eutectic salt mixtures include those of LiCl and KCl (m.p. 352°C), and of LiBr and RbBr (m.p. 278°C).

Typical examples of ternary eutectics include those containing LiF, LiCl and LiI (m.p. 341°C), LiCl, LiI, and KI (m.p. 260°C).

Although the ternary eutectic salt mixtures, particularly those containing the iodides provide lower melting points, the binary eutectic mixture of LiCl and KCl is preferred on the basis of its cost and availability, particularly for batteries to be used in large scale applications such as electric powered vehicles and electric utility bulk energy storage. Advantageously, the cathodes of such batteries would use sulfur or metal sulfides as the active constituents. The preferred cathodes are those containing copper or iron sulfides or mixtures thereof as the active constituents.

For purposes of illustration, because of its commercial importance in providing long cycle life at high energy densities, the invention will be particularly described with respect to a preferred embodiment of a secondary cell consisting of a lithium-molten salt-copper sulfide system, although clearly not limited thereto.

Referring to the FIGURE, a sectional, elevational view is shown of a lithium-molten salt cell 10. The cell comprises a stainless steel vessel 12 containing a negative lithium electrode 14 and a positive electrode 16 immersed in a suitable fused salt electrolyte 18, which is molten at the operating temperature of the cell. Vessel 12 is heated by an electric furnace 20 insulated with a suitable refractory material such as alumina. Negative electrode 14 consists of a foraminous metal substrate structure 22 which has been impregnated with a mixture of lithium metal and a metal additive selected from the group consisting of copper, zinc and mixtures thereof at a temperature of about 650°C. A metal rod 24 is suitably clamped or welded to foraminous metal substrate 22 and serves as the negative terminal lead. The positive electrode 16 consists of a dense graphite cup 26 equipped with a graphite current-conducting rod 28 which serves as the positive terminal lead. Cup 26 is filled to the desired depth with the active material 30, which suitably consists of an intimate powdered mixture of a transition metal chalcogenide, e.g., copper sulfide, and current-carrying graphite. A porous separator 32, suitably of porous graphite or alumina, is placed over the active material and held in place with pins 34 of high-purity alumina. The electrolyte 18, suitably LiCl-KCl eutectic mixture, is preferably saturated with a lithium chalcogenide, e.g., lithium sulfide, generally corresponding to the same chalcogenide component as used in the positive electrode material, e.g., copper sulfide. While vessel 12 of the cell has been illustrated as an open vessel, in actual use the cells would consist of a plurality of sealed units suitably connected in series-parallel arrangement to provide a battery having the desired volt-ampere characteristics and ampere-hour capacity. The term "cell" as used in the specification is broadly intended also to include a "battery", e.g., an assemblage in series or parallel arrangement of two or more electric cells.

The following examples illustrate the present invention but are not intended to limit the scope thereof.

EXAMPLE 1

Five lithium electrodes were prepared from a foraminous metal substrate and tested as follows. The foraminous metal substrate was a commercially available material comprising fine low carbon steel fibers compacted into a flat porous plate and sintered. The material had an apparent density of 14 percent. The median pore size was in the range of from about 60 to 90 microns. The substrate was cut into five pieces each measuring approximately 2.6 cm by 2.6 cm by 0.27 cm thick.

Two electrodes were prepared by impregnating two of the substrates with a mixture containing 70 parts by weight of lithium and 30 parts by weight of zinc at a temperature of 650° to 680°C. The specimens were weighed before and after impregnation, and theoretical capacities were calculated from the known weight of lithium present.

The two electrodes then were tested by placing them one at a time in a molten salt bath containing 58.8 mol percent LiCl and 41.2 mol percent potassium chloride and a sufficient amount of $Li_2S$ to saturate the bath with this material. The purpose of saturating the bath with $Li_2S$ was to simulate the conditions that would be encountered in a battery utilizing a metal sulfide cathode. The bath temperature was maintained at about 400°C. The electrodes were discharged at a constant current against a larger counter-electrode made of the same material and impregnated in the same manner as the electrodes being tested. The test electrode was discharged at constant current equal to 100 ma/cm$^2$, considering only the area of the face of the specimen opposing the counter-electrode, until a voltage change of 0.1 volt was reached. An average recovery of 83 percent of the total theoretical lithium capacity was obtained.

Two more electrodes were prepared by impregnating two substrates with a molten metal mixture containing 30 parts by weight of copper and 70 parts by weight of lithium at 650° to 680°C. These electrodes then were tested in the manner described above. An average capacity of 92 percent of the theoretical capacity was obtained.

A fifth electrode was prepared by impregnating the remaining substrate with a molten metal mixture containing 20 parts by weight of copper, 10 parts by weight of zinc and 70 parts by weight of lithium. The electrode then was tested in the same manner as hereinbefore described. Electrochemical recovery of lithium in this test was 91 percent of the total theoretical lithium capacity.

Based on the void volume of the foraminous substrate, recovery capacities exceeding 80 percent of the theoretical capacity were obtained in all cases, thus, demonstrating the efficacy of the present method and electrode. Further, during discharge the potential of the electrode was substantially equal to that of a pure liquid-lithium anode, thus demonstrating that the additives have no detrimental effect on the electrode potential. Observed energy capacities varied from about 1.2 to 1.8 ah per cm$^3$ of the total electrode volume in these experiments.

EXAMPLE 2

An electrode was made from a commercially available foraminous metal substrate comprising type 430 stainless steel fibers compacted to an apparent density of about 20 percent and sintered. The foraminous substrate had a median pore size of about 220 microns. The electrode was formed by impregnating the foraminous substrate with a molten metal mixture containing 30 parts by weight of copper and 70 parts by weight of lithium at 600°C. The electrode measured 4.5 cm by 8.9 cm by 0.32 cm thick. The weight gain was 9.7 g. This corresponded to about 74 percent of the total volumetric capacity calculated on a void volume basis, thus, demonstrating a disadvantage of the larger pore sizes.

EXAMPLE 3

Two electrodes were prepared from a commercially available foraminous metal substrate comprising passivated type 347 stainless steel fibers compacted to an apparent density of about 10 percent and sintered. The substrates measured 3.2 cm long, 0.64 cm wide by 0.15 cm thick. One substrate was de-passivated in 50 percent aqueous solution of reagent hydrochloric acid and then plated in a conventional copper plating bath containing cuprous cyanide and potassium cyanide in aqueous solution at room temperature. The copper plated substrate was rinsed and dried. An electrode of the present invention then was formed in situ from the substrate by placing it in an electrochemical cell containing a molten electrolyte consisting of 8.5 mol percent LiCl, 59 mol percent LiI and 32.5 mol percent of potassium iodide. The counter-electrode in the cell consisted of a molten pool of lithium metal constrained by a metal cylinder and equipped with a metallic conductor. The bath temperature was maintained at about 340°C. Lithium was electrodeposited smoothly into the copper plated substrate at a current density of 100 ma/cm². On discharge, 88 percent of the electrodeposited lithium was recovered. The same experiment was made with the untreated porous metal substrate. The lithium was electrodeposited as small spheres, many of which floated away. As little as 35 percent of the lithium was recovered on subsequent discharge, thus demonstrating one of the benefits obtained with the present invention.

EXAMPLE 4

An electrode was prepared from a commercially available foraminous metal substrate comprising type 430 stainless steel fibers compacted to an apparent density of 20 percent and sintered. The foraminous metal substrate had a median pore size of 220 $\mu$. The substrate was approximately 3.8 cm by 2.5 cm×0.32 cm thick. The lithium electrode was formed by impregnating the substrate with a molten metal mixture containing 30 parts by weight of zinc and 70 parts by weight of lithium maintained at a temperature of about 650°C.

The electrode so formed then was placed in an electrochemical cell (similar to that shown in the drawing) comprising a cathode and an electrolyte containing 58.8 mol percent LiCl and 41.2 mol percent KCl. The electrolyte was saturated with $Li_2S$ to avoid losses of this material from the cavity of the metal sulfide-containing cathode during discharge. The cathode, immersed in the same electrolyte, comprised a graphite case containing CuS as the active material. The case was covered on one face with a porous alumina separator to permit ionic conductance between the active cathode material and the electrolyte. The active cathode area was approximately 5 cm². The cathode was equipped with a graphite current conducting rod. Electrical contact was made to the lithium electrode by means of a length of 304 stainless steel rod, 1.5 mm in diameter.

The cell was maintained at a temperature of about 400°C by an electric furnace and was contained in a glove box having a high purity helium atmosphere. The cell was cycled at a constant current of 250 ma during both charge and discharge cycles. During this cycling the lithium anode was discharged to about 25 percent of its initial capacity. The cell was operated for 350 cycles over a period of 3 months before the capacity of the lithium anode decreased to less than that of the cathode (which was about 0.4 ampere hours). Because the cell was open to the glove box atmosphere, it is believed that evaporative losses of lithium occur via the reaction of lithium metal with the potassium chloride in the electrolyte to form volatile potassium vapor, thus shortening the life of the lithium anode.

EXAMPLE 5

A lithium electrode was prepared from a commercially available foraminous substrate comprising type 430 stainless steel fibers compacted to an apparent density of 10 percent and sintered. The substrate had a median pore size of about 500 $\mu$, an area of 90 cm² and a thickness of 0.64 cm. The electrode was prepared by impregnating the substrate in a molten metal mixture containing 30 parts by weight of copper and 70 parts by weight of lithium maintained at a temperature in the range of from about 650° to 700°C.

The lithium electrode was placed in an electrochemical cell containing a molten salt electrolyte and provided with two cathodes, each substantially equal in area to each side of the anode and utilizing CuS as the active material. A substantial amount of lithium was released from the electrode when it was immersed in the electrolyte, thus further demonstrating the disadvantage of large pore sizes. The released lithium was removed before testing the electrode. The total capacity of the two cathodes was 17 ampere hours. The capacity of the lithium anode, after removal of the released lithium, was estimated to be approximately 23 ampere hours. The cell also contained an electrolyte which comprised a binary eutectic salt mixture containing 58.8 mol percent LiCl and 41.2 mol percent KCl, saturated with $Li_2S$.

The cell was assembled in a glove box having a high purity helium atmosphere and thereafter sealed with a tight lid to avoid the evaporative anode capacity losses described in Example 4. The cell was charged and discharged at 4.2 amperes for 230 cycles. The capacity of the lithium electrode exceeded that of the two cathodes for that period, in spite of the initial loss of lithium, indicating little loss of lithium electrode capacity over the test period.

While several embodiments of the invention are hereinbefore described, it is to be understood, of course, that the invention is not limited thereto, as numerous modifications and equivalents will be apparent to those versed in the art without departing from the spirit and scope of the invention as set forth in the appended claims.

What is claimed is:

1. A lithium electrode comprising:
   a foraminous metal substrate having an apparent density of from about 5 to 80 percent, a median pore size of from about 5 to 500 microns and a determined volumetric capacity; and
   a mixture of (a) liquid lithium, and (b) a metal additive selected from the group consisting of copper, zinc and mixtures thereof disposed in the metal substrate, said mixture being present in an amount sufficient to fill at least 20 percent of the volumetric capacity of the metal substrate, and said metal additive comprising from at least 10 wt. percent up to about 45 wt. percent of said mixture.

2. The lithium electrode of claim 1, wherein the metal additive is copper.

3. The lithium electrode of claim 1, wherein the foraminous metal substrate has a median pore size of about 50 microns.

4. The lithium electrode of claim 1, wherein the foraminous metal substrate has an apparent density of from about 5 to 60 percent.

5. The lithium electrode of claim 1, wherein the foraminous metal substrate has a median pore size of from about 20 to 200 microns.

6. The lithium electrode of claim 5, wherein the foraminous metal substrate has an apparent density of from about 5 to 60 percent.

7. The lithium electrode of claim 6, wherein said metal additive is present in an amount of about 30 wt. percent of said mixture.

8. A method of forming a lithium electrode comprising:
   providing a foraminous metal substrate having an apparent density of from about 5 to 80 percent, a median pore size of from about 5 to 500 microns and a determined volumetric capacity,
   contacting the foraminous metal substrate with liquid lithium in the presence of a metal additive selected from the group consisting of copper, zinc and mixtures thereof, and
   filling at least 20 percent of the volumetric capacity of the foraminous substrate with a mixture of said liquid lithium and metal additive, said metal additive being provided in an amount sufficient to comprise from at least 10 wt. percent up to about 45 wt. percent of the mixture.

9. The method of claim 8 wherein said foraminous metal substrate is contacted with said liquid lithium in the presence of a metal additive by immersing the substrate in a molten pool of said liquid lithium and said metal additive.

10. The method of claim 8 wherein said metal additive is a mixture of copper and zinc.

11. The method of claim 10 wherein said metal additive is present in an amount of at least 20 wt. percent of the mixture.

12. The method of claim 8 wherein said foraminous metal substrate is contacted with said liquid lithium in the presence of a metal additive by coating the substrate with said metal additive, immersing the coated substrate in a molten salt bath containing lithium ions and electrochemically charging liquid lithium into the coated foraminous metal substrate.

13. The method of claim 12 wherein said foraminous metal substrate is coated by electrodepositing the selected metal additive upon the substrate.

14. The method of claim 8 wherein the selected metal additive is present in an amount of at least 20 wt. percent of the mixture.

15. The method of claim 8 wherein said foraminous metal substrate has an apparent density of from about 10 to 20 percent, a median pore size within the range of from about 20 to 200 microns, and said metal additive is present in an amount of about 30 wt. percent of the mixture.

* * * * *